(12) United States Patent
Bouffay et al.

(10) Patent No.: US 9,399,425 B2
(45) Date of Patent: Jul. 26, 2016

(54) LED LAMP COMPRISING A POWER REGULATING DEVICE

(71) Applicant: Zedel S.A., Crolles (FR)

(72) Inventors: Boris Bouffay, Saint Bernard du Touvet (FR); Alain Maurice, Saint Hilaire du Touvet (FR)

(73) Assignee: Zedel S.A., Crolles (FR)

( * ) Notice: Subject to any disclaimer, the term of this patent is extended or adjusted under 35 U.S.C. 154(b) by 0 days.

(21) Appl. No.: 14/020,114

(22) Filed: Sep. 6, 2013

(65) Prior Publication Data
US 2014/0001955 A1    Jan. 2, 2014

Related U.S. Application Data

(63) Continuation of application No. PCT/EP2012/000982, filed on Mar. 6, 2012.

(30) Foreign Application Priority Data

Mar. 7, 2011 (EP) .................................. 11368004
Dec. 12, 2011 (FR) .................................. 11 03794
Mar. 5, 2012 (FR) .................................. 12 00652

(51) Int. Cl.
*B60Q 1/26* (2006.01)
*B60Q 1/14* (2006.01)
(Continued)

(52) U.S. Cl.
CPC .............. *B60Q 1/1423* (2013.01); *F21L 4/00* (2013.01); *F21V 14/00* (2013.01); *F21V 23/00* (2013.01);
(Continued)

(58) Field of Classification Search
CPC ....................................................... G01N 21/64
USPC ........................ 250/200, 201.1, 204, 205, 552; 315/76–77, 80, 82
See application file for complete search history.

(56) References Cited

U.S. PATENT DOCUMENTS 6,966,668 B2   11/2005  Cugini et al.
7,104,455 B2 *  9/2006  Tsikos et al. ............. 235/462.32
(Continued)

FOREIGN PATENT DOCUMENTS

EP    1297725       4/2003
EP    2 075 630     7/2009
(Continued)

OTHER PUBLICATIONS

PCT International Search Report PCT/EP2012/000982 Mailed: Aug. 22, 2012, Zedel S.A.
(Continued)

*Primary Examiner* — Minh D A
(74) *Attorney, Agent, or Firm* — Saile Ackerman LLC

(57) ABSTRACT

A lamp, as for example a headlamp, comprising:
  a light source having one or more LED-type diodes;
  a power unit for generating electric power of said light source, said unit being controlled by a control information or a control signal;
  a control unit for adjusting the light generated by said light source;
wherein the control unit comprises an image sensor generating at least one image of the illuminated area from said light source and means for processing said image in order to generate said control information or said control signal The lamp also includes a processor for image processing capable of performing complex analysis of the image, including the recognition of a rope, fog detection etc. . . .

12 Claims, 11 Drawing Sheets

(51) Int. Cl.
    *H05B 33/08*  (2006.01)
    *H05B 37/02*  (2006.01)
    *F21V 23/04*  (2006.01)
    *F21V 25/00*  (2006.01)
    *F21V 14/00*  (2006.01)
    *F21V 23/00*  (2015.01)
    *F21L 4/00*   (2006.01)
    *F21Y 101/02* (2006.01)

(52) U.S. Cl.
    CPC ............ *F21V 23/0478* (2013.01); *F21V 25/00* (2013.01); *H05B 33/0818* (2013.01); *H05B 33/0854* (2013.01); *H05B 37/0227* (2013.01); *F21L 4/005* (2013.01); *F21Y 2101/02* (2013.01); *Y02B 20/341* (2013.01); *Y02B 20/44* (2013.01)

(56) References Cited

U.S. PATENT DOCUMENTS

| | | | |
|---|---|---|---|
| 7,410,271 | B1 | 8/2008 | Man |
| 7,646,973 | B2 | 1/2010 | Howard et al. |
| 8,378,587 | B2 | 2/2013 | Huguenin et al. |
| 8,529,086 | B2 | 9/2013 | Skrivan et al. |
| 2002/0015097 | A1 | 2/2002 | Martens et al. |
| 2003/0123705 | A1* | 7/2003 | Stam et al. ............... 382/104 |
| 2005/0099798 | A1 | 5/2005 | Cugini et al. |
| 2007/0098391 | A1 | 5/2007 | Howard et al. |
| 2007/0272841 | A1* | 11/2007 | Wiklof ............... G01S 7/4817 250/234 |
| 2008/0198586 | A1 | 8/2008 | Man |
| 2010/0158348 | A1* | 6/2010 | Kawaguchi ............ 382/149 |
| 2010/0214791 | A1* | 8/2010 | Schofield ............ B60Q 1/1423 362/466 |
| 2011/0031901 | A1 | 2/2011 | Huguenin et al. |

FOREIGN PATENT DOCUMENTS

| | | |
|---|---|---|
| FR | 2930706 | 10/2009 |
| FR | 1200652 | 11/2014 |
| WO | WO 01/99474 | 12/2001 |

OTHER PUBLICATIONS

PCT Written Opinion PCT/EP2012/000982 Mailed: Aug. 22, 2012, Zedel S.A.
Chinese Search Report 2012800122741 Mailed: Jul. 28, 2014, Zedel.

* cited by examiner

LED LAMP COMPRISING A POWER REGULATING DEVICE

This application is a Continuation of PCT Application no. PCT/EP2012/000982, which was filed on Mar. 6, 2012.

TECHNICAL FIELD

The present invention relates to lamps fitted with LED diodes, and in particular to a headlamp having a device for regulating the power of the LED.

BACKGROUND

Headlamps are used in a large number of activities, e.g. professional, sports and leisure.

In general, these lamps are designed to enable efficient and "hand-free" lighting, providing comfortable use with maximum battery life.

Patent application FR2930706 dated Apr. 24, 2008 describes a self-regulated lamp using a sensor for sensing the light reflected by an object illuminated by the lamp so as to allow the control of the brightness of the lamp. FIG. 1 illustrates such a prior art lamp that includes an optical sensor housed in the casing 14 in the vicinity of the light emitting diode LED 11 for generating a signal representative of the light reflected by the surface of an illuminated object 16, and for transmitting said signal to a second input of a control unit 13 to automatically control the power of the LED according to a predetermined threshold. In this way, an automatic regulation of the light beam emitted by the lamp is achieved without requiring any manual action for adapting the light to the environment, while managing energy consumption.

Thus, thanks to such a process, the light intensity varies according to the illuminated object, rising when the user's vision is distant and reducing the contrary in the case of near vision, especially when the light is focused on a object being "close" to the lamp.

This process significantly increases the comfort of the lamp as well as the battery life.

Nevertheless, new needs arise in the regulation of light intensity, which can not be satisfied with the aforementioned lamp.

Generally, it is desirable to have more sophisticated regulatory mechanisms that are likely to meet new expectations expressed by headlamps users, whatever their category: sports, military, professional, or simply "enlightened" amateurs.

SUMMARY

It is one of the objects of the present invention to provide an alternative technique to manage the power consumption of the headlamp.

It is an object of the present invention to provide a headlamp having a advanced control mechanism for enhanced security, new functionalities and also improving the battery life.

It is another object of the present invention to provide a process for controlling the light intensity of a headlamp achieving improved control compared to conventional lamps, for the purpose of increasing the practicality of the lamp, including the adaptation to various uses and specific profiles.

It is another object of the present invention to provide a headlamp having new functionalities which can be used in a wide number of applications.

These goals are achieved by means of a lamp comprising:
a light source having one or more LED-type diodes;
a power unit for powering said light source, said power unit being controlled by a control information or a control signal;
a control unit for regulating the light generated by said light source.

The lamp control unit comprises an image sensor generating at least one image of the area illuminated by said light source and means for processing said image in order to generate the control information or the control signal.

In one particular embodiment, the processing means determine a Specific Control Area (SCA) within said image, and subject to an image processing for generating the control information or the control signal.

Preferably the processing means includes an image processor for performing a calculation of the average brightness of pixels representative of said image for comparison with a threshold in order to generate the control information or the control signal.

In one particular embodiment, the image processor performs an analysis of the contrast of said image for the purpose of detecting fog, mist and/or smoke particles.

In another particular embodiment, the lamp includes a second sensor generating a second information representative of the reflected light intensity of the illuminated area, the control of said light source being derived from both the digital processing of the pixels and the processing of said second information.

Preferably, the image processor performs the detection of a band of pixels of brightness higher than a threshold, approximately vertical, the pixels corresponding to said pixel band being excluded from said specific SCA area determined by said image processor.

Alternatively, the image processor also allows the detection of periodic passage of hands and/or detection of external sources such as snowflakes or car headlights, in order to exclude from the SCA area the pixels which might interfere with the regulatory process.

Preferably, detection of fog, mist and/or smoke particles is improved by means of an infrared light (IR) lamp having an axis being decentered relative to the axis of said light source, and by control means for controlling the IR lamp for generating an infrared beam when no visible light is produced by said light source. Detection means for detecting the reflected infrared light allow the generation of an information representative of the presence of fog, mist and/or smoke particles.

Preferably, the lamp also comprises a speed sensor and/or acceleration sensor in order to generate the control information or the control signal.

Preferably, the lamp comprises configuration means for configuration of the lamp, in particular according to one or more predetermined profiles, such as in particular a USB port for communicating with a computer, a touch pad, or a smart phone.

Preferably, the lamp is a headlamp.

The invention also achieves a process for adjusting the light generated by a lamp comprising one or more LEDs, a controllable power unit for powering the LED lamps and a control unit for regulating the light generated by the lamp, said process comprising the steps of:
generating an image of the area illuminated by the lamp by means of an image sensor;
storing the image within a storage memory;
processing the image for generating an control information or a control signal for the power unit so as to regulate the luminous power emitted by the latter.

Preferably, the process further comprises the steps of:
calculating the average brightness of the pixels of said image or a Specific Control Area (SCA) of said image;
comparing the result of said calculation with a predetermined threshold;
generating a control information or a control signal for increasing the light intensity of the LEDs when said result is less than the predetermined threshold;
generating an information or a control signal for reducing the brightness of LED when said result exceeds the predetermined threshold.

In a particular embodiment, the predetermined threshold is chosen to match the sensitivity of a human eye.

BRIEF DESCRIPTION OF THE DRAWINGS

Other features, objects and advantages of the invention will become apparent upon reading the following description and drawings below, given by way of non-limiting examples. In the accompanying drawings:

FIG. 12b illustrates the process of operation of the embodiment of FIG. 12a.

DESCRIPTION

The examples will be now be described are particularly suitable for the production of a lighting lamp fitted with LED power diodes, and in particular a headlamp.

Clearly, these are only non-limiting examples and a skilled man could adapt the teaching of the invention to other lighting devices to increase operational safety.

Figure 1:
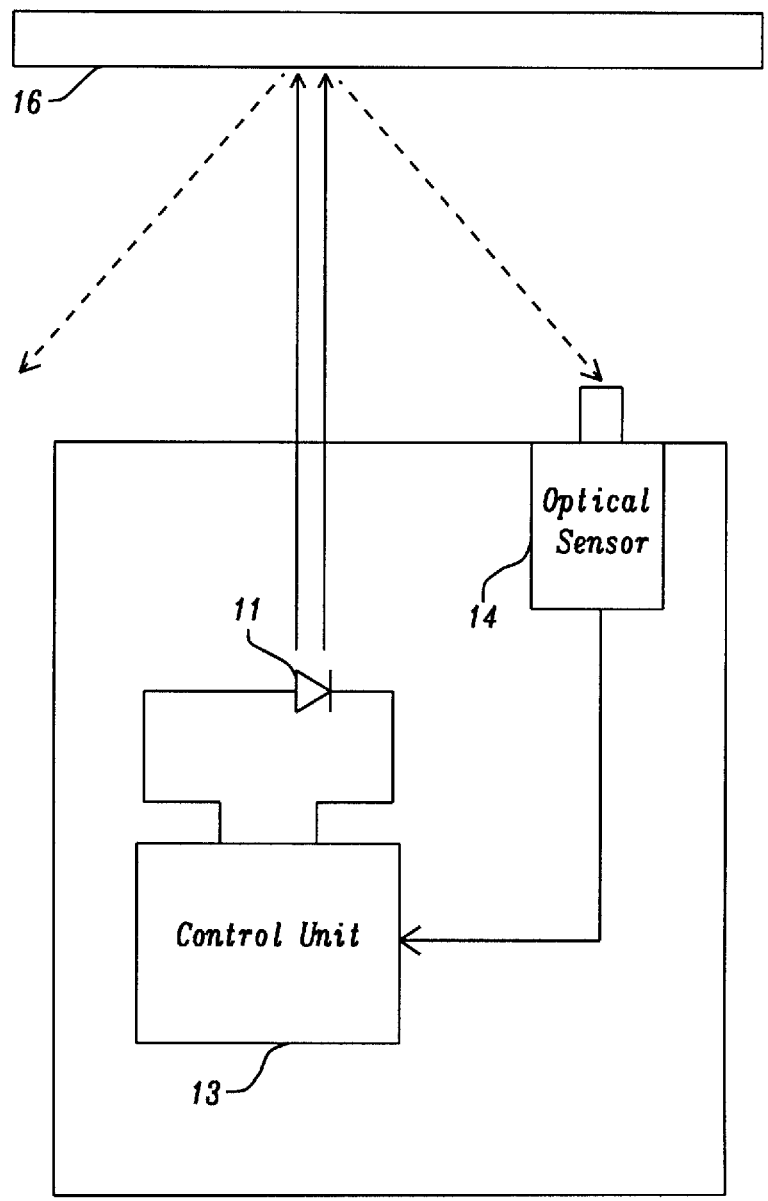
FIG. 1 illustrates an example of a lamp known in the prior art, having a regulation of the power consumption.
Figure 2:
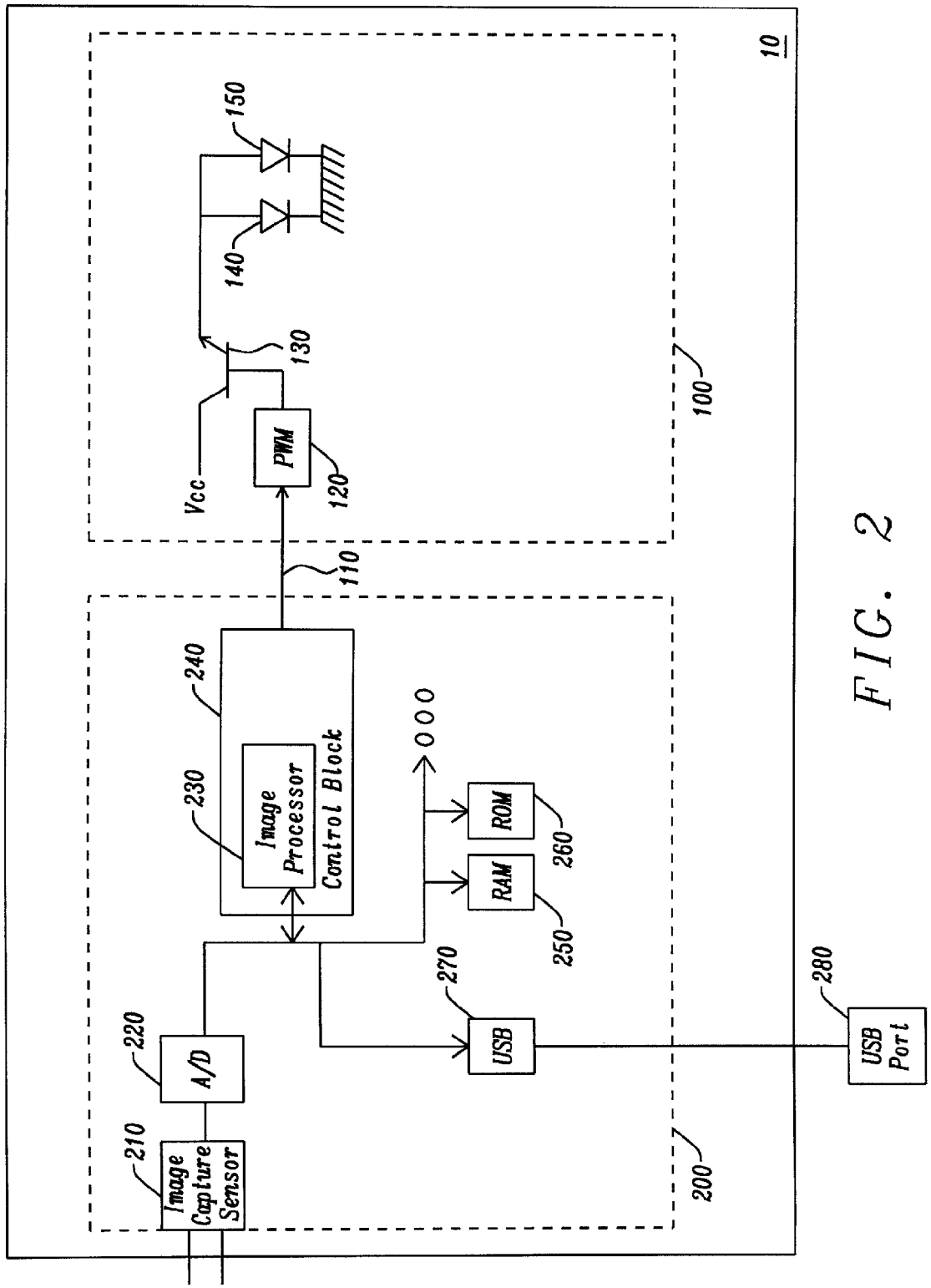
FIG. 2 illustrates a first embodiment of a lamp according to the present invention, achieving regulation of the power consumption.

FIG. 2 illustrates the general architecture of a first embodiment of a lamp 10—assumed to be a headlamp—with sophisticated means for controlling the light intensity. The lamp 10 includes a power unit 100 combined with a control unit 200.

Power unit 100 specifically includes all the components that are conventionally found in an LED light lamp for producing a light beam having a high intensity.

In this regard, the circuit includes a battery (not shown in the figure), which generates a supply voltage Vcc, one or more light emitting diodes LED—two diodes 140 and 150 are shown in for example—supplied by a semiconductor type power switch 130 such as a bipolar transistor, a FET (Field Effect Transistor) or MOSFET (Metal Oxide Semiconductor) or MOSFET. For the purpose of reducing the Joule losses, one controls the switch 130 by means of a pulse width modulation PWM, which is well known to the skilled man and which is similar to what is known in the Class D audio circuits. Such PWM modulation is generated by a PWM circuit 120 which is controlled, at its input 110, by a control signal. In general, it should be noted that the term "signal" mentioned above refers to an electrical quantity—current or voltage—used for controlling the power unit. This is however only a non limiting example, and it is possible to replace the "control signal 110" by a "control information", eg logical information that can be stored in a register or in memory and thus transmitted by any appropriate means to control unit 100 to produce the corresponding luminous flux. In one particular embodiment, one may even consider that both control unit and power unit are integrated into a single module or integrated circuit.

One skilled in the art will readily understand, therefore, that when we refer to a "control signal 110", one equally encompasses the embodiments based on an electric control variable—current or voltage—as well as embodiments in which the control is performed by means of a logic information conveyed to the power unit. For this reason, we will discuss below indiscriminately control signal or control information.

In general, the components that make up the power unit 100—switches and circuits—are well known to those skilled in the art and the description will be deliberately reduced in this regard for the sake of conciseness. Similarly, the reader is referred to the general literature on various aspects of the PWM modulation.

The control unit 200 includes a control block 240, which generates the control signal (or control information) transmitted to the input 110 of the power unit 100 for the purpose of controlling PWM circuit 120 and, finally, achieving the regulation of the luminous intensity produced by the LED diodes.

In the embodiment of FIG. 2, the control block 240 further includes an image processor 230 communicating via conventional address, data and control bus with a RAM memory 250, ROM or EEPROM memory 260, etc. . . .

The control unit 200 further comprises an image capture sensor 210 which is shown in FIG. 2 as an analog sensor, such as for example a video camera or an analog module provided with its optical system. The unit 200 further comprises an analog-to-digital converter 220 for converting into digital information the analog signals generated by image capture sensor 210, which digital information can then be made available to image processor 230 via the data, address buses etc. . . .

In one particular embodiment, a fully digital structure is being considered and the units 300-310 will be replaced by a digital sensor, such as a CCD (Charge Coupled Device) sensor well known in the field of digital photography. A digital image, arranged in pixels—e.g. with a size 640×480 pixels—will then be directly available. Each pixel I (x, y) will be assigned a value representative of the brightness of the image or its color components.

In a preferred embodiment, the image capture sensor has an axis which corresponds to the axis of the LEDs so that the image sensed by capture sensor 210, coincides with the area illuminated by the latter.

In another embodiment, a USB port 280 is accessible via a USB module 270 which is included in the control unit and connected to the bus, allowing the exchange of data according to the USB standard. Specifically, the USB interface will allow, as this will be seen below, the storage of settings parameters and profiles within the lamp.

In this way, the control unit can communicate with a data processing device such as a computer, a laptop, a touch pad, a personal assistant and even a smartphone It should be noted that the USB port is only one illustrative example of a means for achieving communication between the lamp and a computer, and a skilled person may consider any other communication means, including wireless communication means (Bluetooth, wifi etc. . . . ). In one particular embodiment, the headlamp will be arranged with its own IP (Internet Protocol) address so as to allow easy configuration, for instance through a dedicated web server.

Such communication is particularly advantageous, for instance for exchanging configuration data and settings, such as "profiles" that can serve for storing and selecting, as necessary, the settings of the lamp in accordance with the desired use wished by its owner, and especially settings for implementing the illustrative functional diagrams which will be described below. Alternatively or additionally, the "profiles" can be used, as described below, for executing specific procedures or modes, such as the so-called static mode (wherein the regulation process is disactivated) and the dynamic mode (wherein the regulation process is fully operational).

One will now more specifically describe the operation of the architecture described above which achieves particularly useful regulation of the transmission power of the LED.

In contrast to the known lamp in which the transmission power was controlled according to the brightness reflected from the illuminated object, it is now proposed to control the power in accordance with a logical processing of the image captures par capture sensor 210, and transmitted to image processor 230. More specifically, one can combined the image processing with an information representative of the signal reflected by the illuminated object, already known to the aforementioned lamp.

Figure 3:
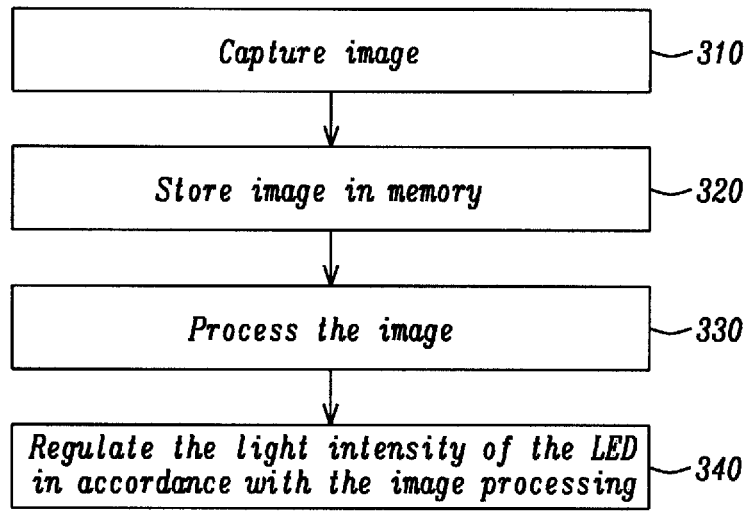
FIG. 3 illustrates a first embodiment of a process according to the present invention for controlling and regulating the light generated by a lamp.

An embodiment of a process is more specifically illustrated in FIG. 3, which process starts with a step 310 in which an image is subject to capture or a sensing by means of image capture sensor 210.

Then, in a step 320, the image is transferred via the data and address busses of the control unit 100 and the process performs the storage of said image within a memory such as RAM memory 250 illustrated in FIG. 2.

Then, in a step 330, the process performs a logical processing of the image stored by means of image processor 230. In one embodiment, each image is separately processed so as to generate a control information (or control signal) for the power unit 100. Alternatively, the image processor performs collective or batch processing of a series of multiple images stored within the memory so as to periodically generate the control information (or control signal) for the power unit 100 for achieving a periodic feedback control of the luminous power of the lamp.

In general, one may consider various logical and digital processings of the captured images.

In particular, one man skilled in the art may decide to perform a sequential processing of the different individual pixels composing each image as well as the different color, brightness, contrats components . . . . One may further consider the process of the entire image or only one particular area (which will hereinafter be designated as a Specific Control Area (SCA)). In addition, the process may also involve the processing of a succession of images so as to achieve a time integration of the various components of the image and thus derive therefrom a statistical information that can be used for controlling the light intensity of LED lamps.

Even more sophisticated, one may also encompass, in the logic and/or digital processing of the image, some algorithms achieving shape and/or objects recognition for the purpose of generating a control information or a control signal to be forwarded to power unit 100, as this will be described more particularly below.

Upon completion of this image processing being performed in step 330, the process then proceeds to a step 340, which is the generation and transmission of the control information (or control signal) to control power unit 200, which can then produce a luminous flux perfectly controlled and regulated according to the result of the digital processing performed by the image processor 230.

Figure 4:
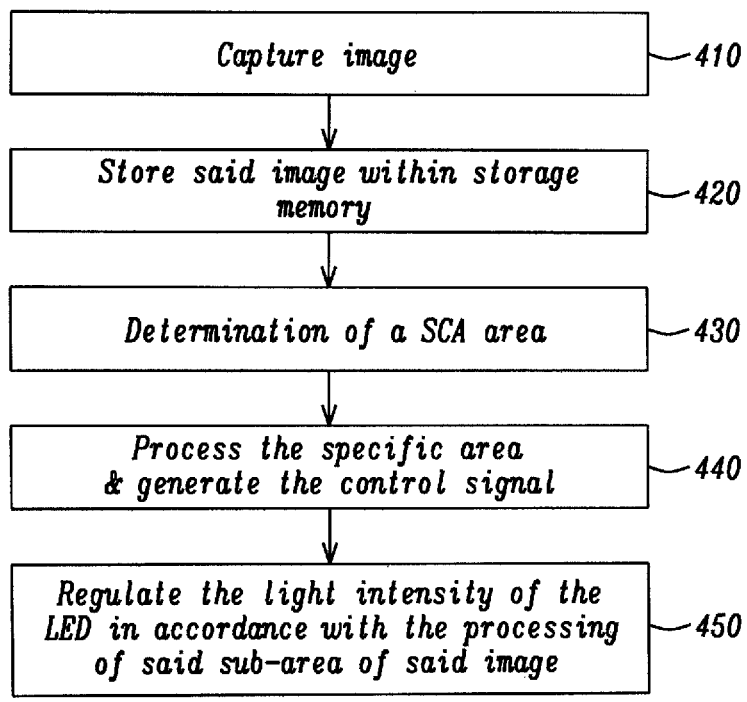
FIG. 4 illustrates a second embodiment implementing a specific control area.

FIG. 4 illustrates a second embodiment of a process for controlling and/or regulating the light intensity of the LEDs, wherein the image processor only processes a portion of the image, hereinafter designated under the name Specific Control Area (SCA).

The process starts with a step 410 where the image capture sensor 210 captures an image.

Then, in a step 420, the process proceeds with the storing of said image within a memory such as RAM memory 250.

Then, in a step 430, the process proceeds with the determination of a Specific Control Area (SCA) of the image thanks to the image processor 230.

Then, in a step 440, the process proceeds with the processing said SCA area by means of the image processor 230, so as to generate an control information or control signal.

Then, in a step 450, the process proceeds with the transmission of the control information or control signal to the power unit 100 so as to achieve the control of the luminous intensity of the LEDs 140, 150 in accordance with the result of processing performed in step 440. One thus achieves, in this manner, to control the light intensity of the LEDs in accordance with part only of the information received by the image capture device corresponding to the SCA defined in step 430.

One thus sees how flexible is the process which allows various possibilities of feedback control and regulation of the power of the lamp.

Figure 5:
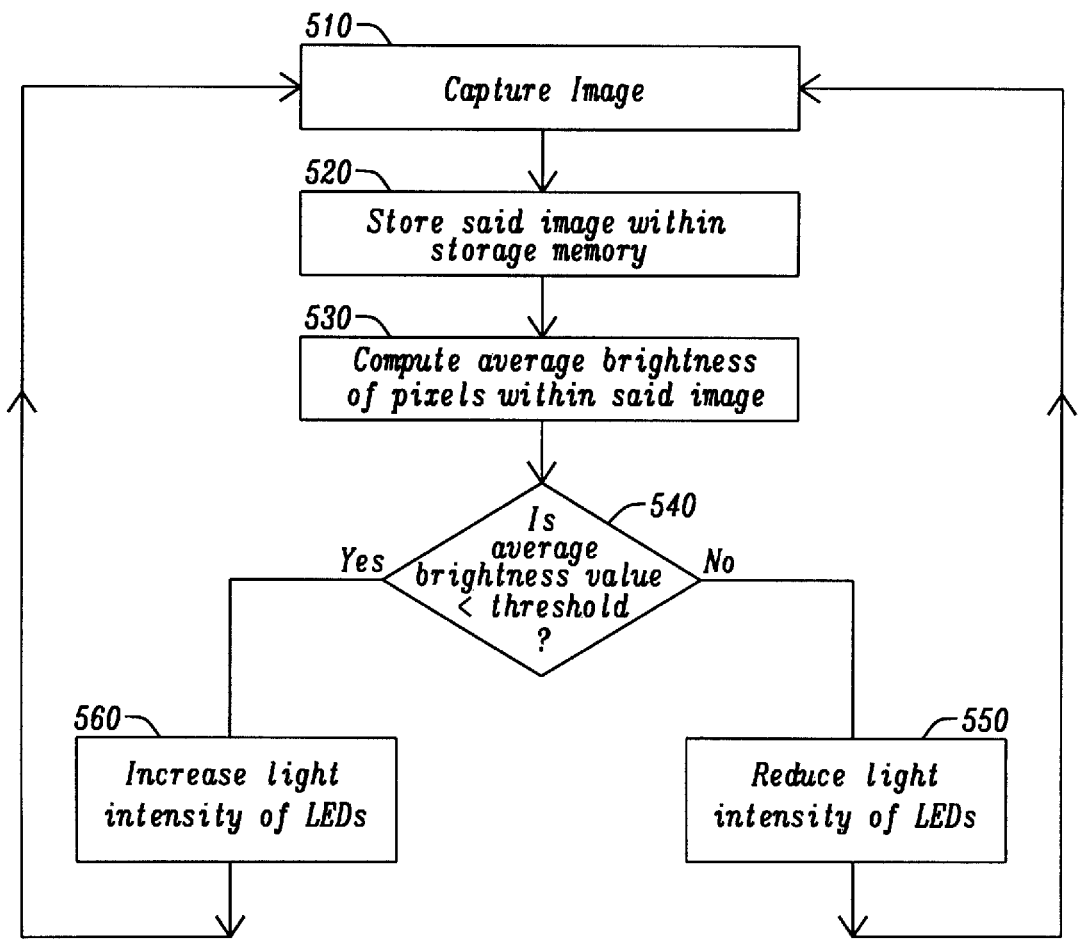
FIGS. 5 and 6 illustrate two embodiments of a processing the brightness, respectively within the entire image and within a specific area thereof.
Figure 6:
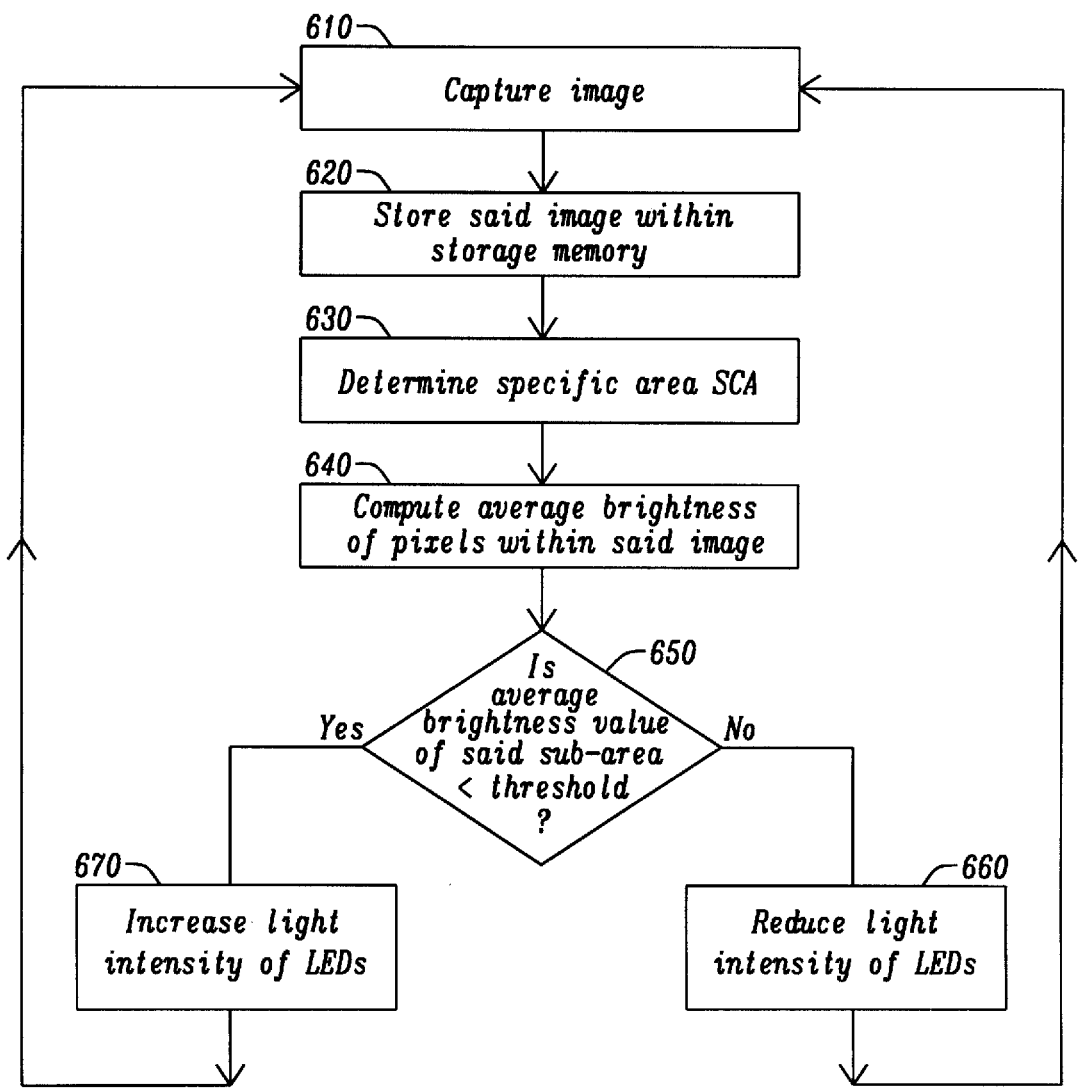
Figure 7:
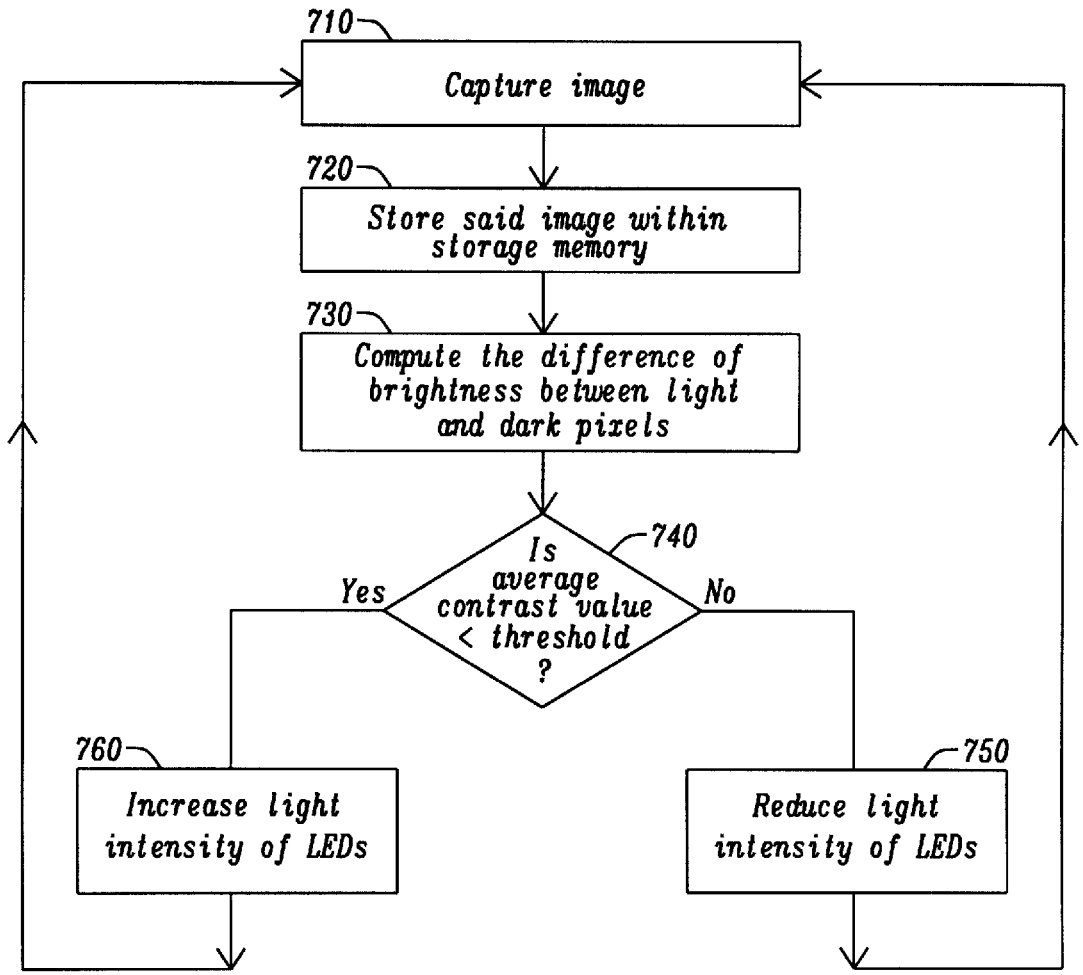
FIGS. 7 and 8 illustrate two embodiments of a processing of the contrast, respectively within the entire image and within a specific area thereof.
Figure 8:
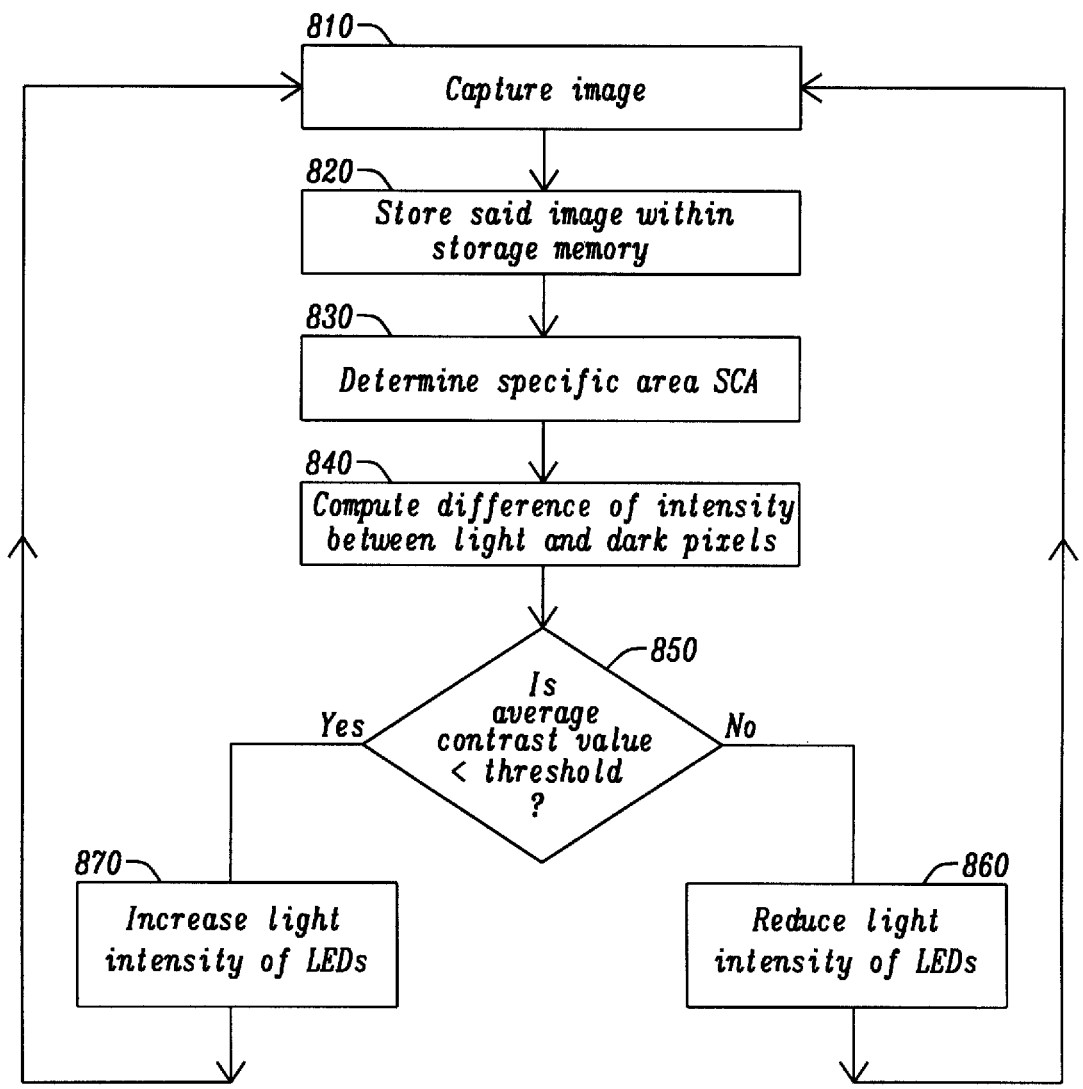

As an illustration, we will specifically describe a processing of the brightness in FIGS. 5-6, and a more specific processing of the contrasts with FIGS. 7 and 8.

The process of FIG. 5 starts with a step 510 where, the image capture sensor 210 captures an image.

Then, in a step 520, the process continues with the storage of said image within the storage memory.

Then, in a step 530, the process proceeds with the calculation of the average brightness of the pixels of said image by means of the image processor 230.

Then, in a step 540, a test is performed by the image processor 230, namely a comparison between the value of the average brightness of the pixels of said image and a predetermined threshold value stored within RAM memory 240. In one embodiment, the predetermined threshold is selected to match the sensitivity of the human eye in order to make regulation as natural as possible for the average user control.

When the average brightness value exceeds the predetermined threshold, the process continues with a step 550, where a control information (or a control signal) is generated and transmitted to the power unit so as to reduce the amount of light generated by the LEDs.

The process then returns to step 510 where the image sensor 210 captures a new image.

In contrast, where, during the test of step 540, the value of the average brightness of the pixels of said image is less than the predetermined threshold, the process continues with a step 560 during which said control unit 240 generates a control information or a control signal for increasing the light generated by the LED.

The process then returns to step 510 where the image sensor 210 captures a new image.

FIG. 6 illustrates one embodiment of a method for controlling the light intensity of the lamp with a more particular implementation of a more specific implementation of a Specific Control Area (SCA).

The process starts with a step 610 where the image sensor 210 captures an image.

Then, in a step 620, the process continues with the storing of said image within a memory storage, such as RAM storage 250 and ROM 260 shown in FIG. 2.

Then, in a step 630, the process proceeds to the determination of a specific control area (SCA) of the image by means of image processor 230.

Then, in a step 640, the process proceeds with the calculation of the average brightness of the pixels of said SCA area of said image, by means of said image processor 230.

Then, in a step 650, a test is performed by the image processor 230, namely a comparison between the value of the average brightness of the pixels of said SCA area of said image and a predetermined threshold value stored in the memory.

Then, in a step 660, the process proceeds with the generation by said control block 240 of a control information or control signal for reducing the amount of light generated by the LEDs when the average brightness value of the SCA pixels exceeds the predetermined threshold.

The process then returns to step 610 where the image sensor 210 captures a new image.

If, during the test of step 640, the average brightness value of the pixels of said SCA area is below the predetermined threshold, the process then continues with a step 670 wherein a control information or a control signal is generated so as to increase the amount of light generated by the LEDs.

The process then returns to step 610 for capturing a new image.

The image processor 230 therefore performs an appropriate image processing in order to derive control information or a control signal determining the power emission of the LED, and consequently the brightness of the lamp. In practice, brightness variations can follow either a continuous or a discrete profile. In the simplest implementation, one can consider a simplified modulation of the emission power on the basis of a number of levels for the purpose of carrying out a gradual progression of the nominal emitting power: 100%, 80%, 60% etc. . . . In more sophisticated embodiments, one may consider a real feedback linear control of the emitting power achieving a continuous variation in accordance with the average brightness derived from the image processing.

Beyond the processing of the sole brightness, the process may further involve the processing of the contrast as that illustrated with reference to FIG. 7, which process starts with a step 710 where the image sensor 210 captures an image.

Then, in a step 720, the process proceeds with the storing of said image within the storage memory.

Then, in a step 730, the process proceeds with the computation of the difference in intensity between light and dark pixels by means of the image processor 230, so as to generate an information that is representative of the image contrast, for example the average value of the contrast of the entire captured image.

Then, in a step 740, a test is performed by the image processor, namely a comparison between the average contrast value and a predetermined threshold value stored within the memory.

When the average contrast value exceeds the predetermined threshold, the process proceeds to a step 750, where a control information or a control signal is generated and forwarded to the power unit 100 so as to reduce the light intensity generated by the LEDs.

The process then returns to step 710 to capture a new image.

If, during the test of step 740, the average value of the contrast is inferior than the predetermined threshold, the process proceeds to a step 760 where said control block 240 generates a control information or a control signal for increasing the light intensity generated by the LED.

The process then returns to step 710 for the purpose of capturing a new image.

As it can be seen with the embodiment of FIG. 7, a contrast processing can also be advantageous to generate useful information for regulating the lamp power. Such processing can include the determination of the presence of fog, mist, etc. . . . , many situations where it may be appropriate to increase the brightness of the lamp. Generally, this contrast processing can usefully complement other treatments which are described in this patent application.

FIG. 8 illustrates more particularly one embodiment wherein the calculation of the contrast is performed only on a Specific Control Area (SCA) of the image, which process starts with a step 810 for capturing the image by sensor 210.

Then, in a step 820, the process continues with the storage within storage memory of said image.

Then, in a step 830, the process proceeds with the determination of the SCA area by means of the image processor 230.

Then, in a step 840, the process proceeds to the calculation of the average difference of the intensity between the light and dark pixels within the SCA area, so as to generate an information which is representative of the contrast, for instance the average value thereof.

Then, in a step 850, a test is performed for comparing the average contrast value within the specific area with a predetermined threshold.

When the average contrast value within the specific area exceeds the predetermined threshold, the process generates, in a step 860, a control information or a control signal to reduce the amount of light generated by the LEDs.

The method then returns to step 810 to capture a new image.

On the contrary, if, at the test of step 840, the average contrast value in the SCA area is less than the predetermined threshold, the process continues with a step 870 to generate a control information or a control signal for increasing the light generated by the LED.

The method then returns to step 810 for the purpose of capturing a new image.

The examples which are illustrated in FIGS. 5-8 show how effective and flexible can be the control process and the regulation of the emitting power of the lamp, which can be adapted to various situations for the purpose of increasing the accuracy of the feedback control and/or the number of functionalities of the lamp.

In one particular embodiment, the specific area SCA—which is particularly computed in steps 630 and 830 of FIGS. 6 and 8—is determined by means of complementary algorithms implemented for the purpose of detecting distinct objects or artefacts or specific areas within the image.

In one particular embodiment, a specific algorithm implemented in the context of climbing or caving is used for identifying a band of approximately vertical over-exposure, corresponding to the imprint on the CCD sensor of the image of a rope. The process then leads, in steps 630 and 830 described above, except for the pixels of the SCA area which correspond to the over-exposed imprint of the rope and thus avoid the disturb the regulation process.

In another particular embodiment, the steps 630 and 830 implement another specific algorithm that identifies the periodic passage of hands in front of the image sensor, for example when the user of the lamp climbs a rope. In such a context of climbing activity, the image processing performed by the image processor 230 identifies the image of hands periodically passing in front of the sensor and excludes from the SCA area the pixels corresponding to the hands so as to minimize the interference with the regulation process of the lamp.

Climbing and/or caving situations are, however, not the only ones which are likely to take advantage of the significant possibilities allowed by the image processing. Indeed, in another embodiment which may be a more conventional "jogging" or "hiking" situation, the image processor implements an algorithm for the purpose of recognition of specific objects, such as car headlights or any other external source so, once again, to exclude from SCA area the pixels corresponding to these objects.

In another embodiment, the steps 630 and 830 implement another specific algorithm for the purpose of identifying artefacts within the image, of the type "snow" so as to exclude the corresponding pixels of the SCA area, due to their over-exposure to the light flux which might interfere with the regulation process of the lamp. In one embodiment, upon recognition of snow, the process proceeds to the deactivation of the regulation system and thus switches to a static mode.

As it can be seen, a lamp having an imaging sensor can offer multiple possibilities, and a man skilled in the art will be able to adapt the teaching of the present invention to various practical and concrete situations.

In one particular embodiment, in order to make more user-friendly the use of a image sensor, the objects recognition algorithms and more generally image processing algorithms performed by processor 230 are executed only when activating a configuration corresponding to various predetermined profiles, including by way of illustration a profile "climbing/caving" that the user can activate or not before using the lamp. Specifically, the activation profile "caving" can be made via the USB port 280 or any equivalent communication means.

Figure 9:
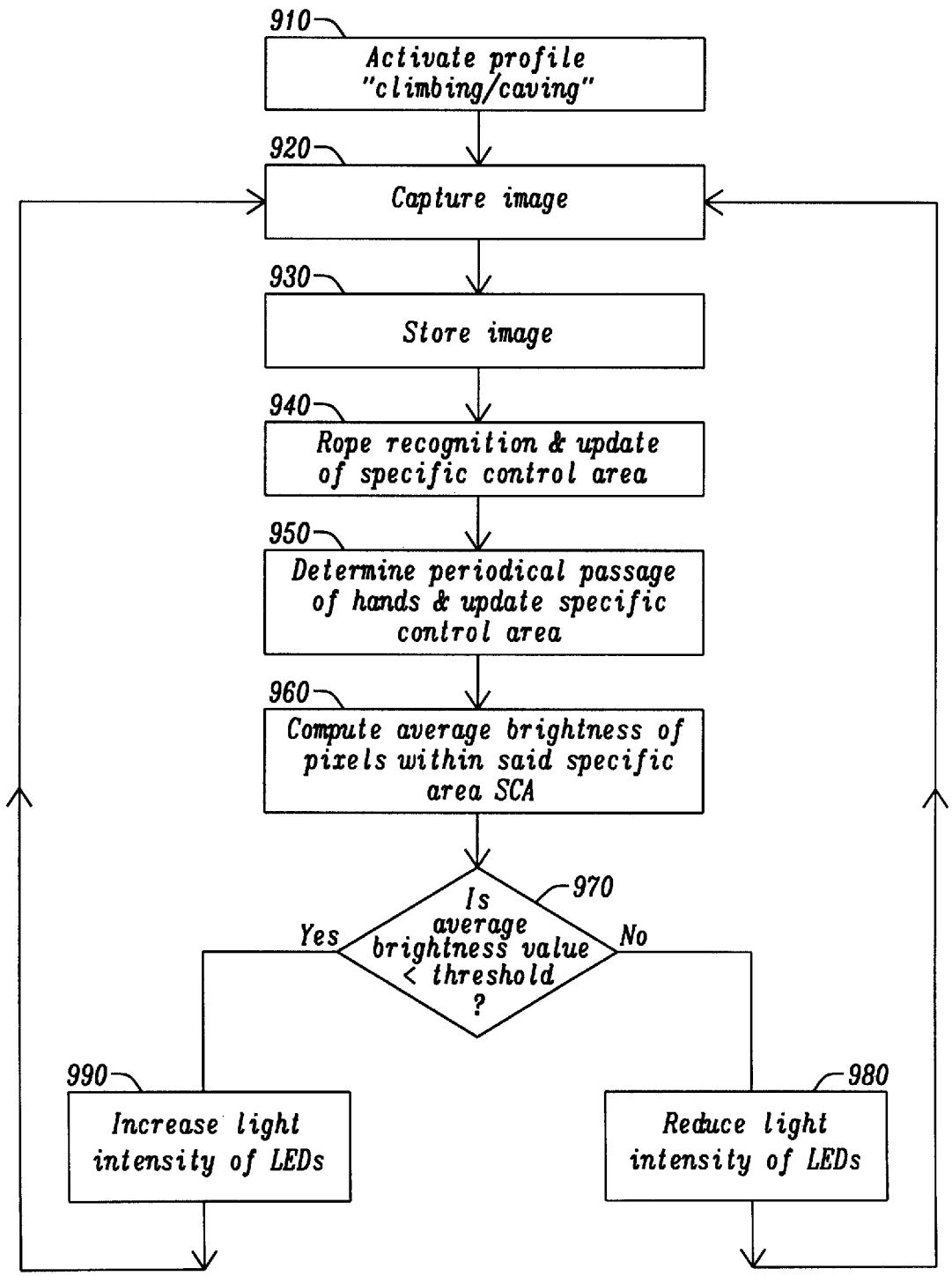
FIG. 9 illustrates an embodiment of a process for controlling the lamp adapted to a particular "climbing/caving" type profile.

FIG. 9 illustrates more specifically that process for controlling the lamp, which can be used in a first profile, said climbing or caving.

In a step 910, the process starts with the activation of the corresponding profile, particularly through the configuration of the lamp via an external terminal (portable computer, smart phone, etc. . . . ).

Then, in a step 920 the process continues with the capture of an image by means of image sensor 210.

Then, in a step 930, the process proceeds with the storage of said image within the storage memory.

Then, in a step 940, the process continues with the execution of a rope recognition algorithm allowing the identification, within the pixelized image, of a vertical strip of approximately well over-exposed pixels. Once identified, the pixels representative of this band are then excluded from the specific control area (SCA), which is then updated.

Then, in a step 950, the process proceeds with the execution of an algorithm performing a batch processing on successive images so as to determine the period passage of hands in front of the sensor 210. Once identified, the corresponding pixels are also excluded from the SCA area.

Once the SCA area is defined, the process proceeds with the calculation, in a step 960, of the average brightness value within the SCA area.

Then, in a step 970, a test is performed by the image processor so as to compare the average brightness value with a predetermined threshold (determined by the activation of specific profile).

When the average brightness value exceeds the predetermined threshold, the process then proceeds to a step 980, where a control information or a control signal is generated and forwarded to the power unit so as to reduce the amount of light generated by the LEDs.

The process then returns to step 920 for the purpose of capturing a new image.

If, during the test of step 970, the average contrast value is below the predetermined threshold, the process then proceeds to a step 990 where control block 240 generates a control information or a control signal for increasing the light intensity generated by the LED.

The process then returns to step 920 for the purpose of capturing a new image.

Figure 10:
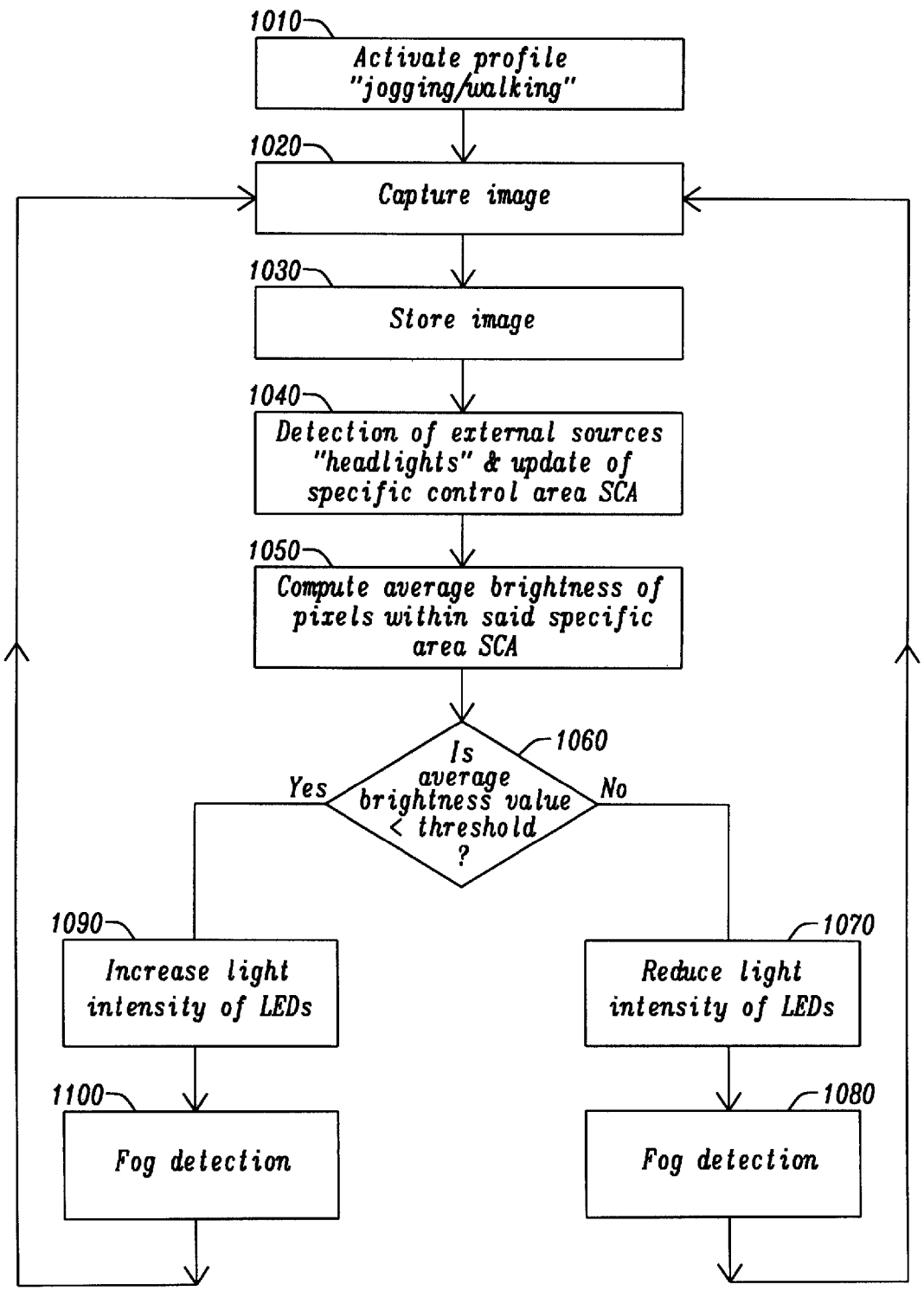
FIG. 10 illustrates another embodiment of a process for controlling the lamp adapted to a "hiking/jogging" type profile.

FIG. 10 illustrates more specifically to a process for controlling the lamp used in a second profile, of the type "jogging/walking".

In a step 1010, the process starts with the activation of the corresponding profile which, as mentioned above, may be made via an external device to the lamp, such as a computer, a smart phone etc. . . . .

Then, in a step 1020 the process continues with the capturing of an image by means of image sensor 210.

Then, in a step 1030, the process continues with the storage of said image within the storage memory.

Then, in a step 1040, the process proceeds with the execution of a recognition algorithm for the detection of external sources, such as cars headlights which can be identified by detecting two light disks within the pixelized image. Once identified, the pixels representing these discs are then subtracted from the specific control area (SCA), which is then updated.

Then, in a step 1050, the process proceeds with the calculation of the average brightness within the SCA area.

Then, in a step 1060, a test is performed by the image processor in order to compare the average brightness value with a predetermined threshold (set by the activation of the determined profile: "jogging/walking").

When the average brightness value exceeds the predetermined threshold, the process proceeds to a step 1070, wherein a first result produced by the image processor to reduce the power of LEDs.

The process then proceeds to a step 1080 involving a fog detection algorithm, based on a particular contrast analysis as described above, so as to bring a next correction element, positive or negative, to the first result generated in the previous step, and finally produce the control information or control signal to the power unit 100.

The process then returns to step 1020 for the purpose of capturing a new image.

If, during the test step 1060, the average contrast value is less than the predetermined threshold, the process continues with a step 1090, where a second result is generated by the image processor, in order to increase the emitting power of the LEDs.

The process then proceeds, during a step 1100, to a fog detection algorithm, similar to the step 1080 so as to bring a next correction element, and finally produce the control information or the control signal to the power unit 100.

The process then goes back to step 1020 for the purpose of capturing a new image.

Figure 11:
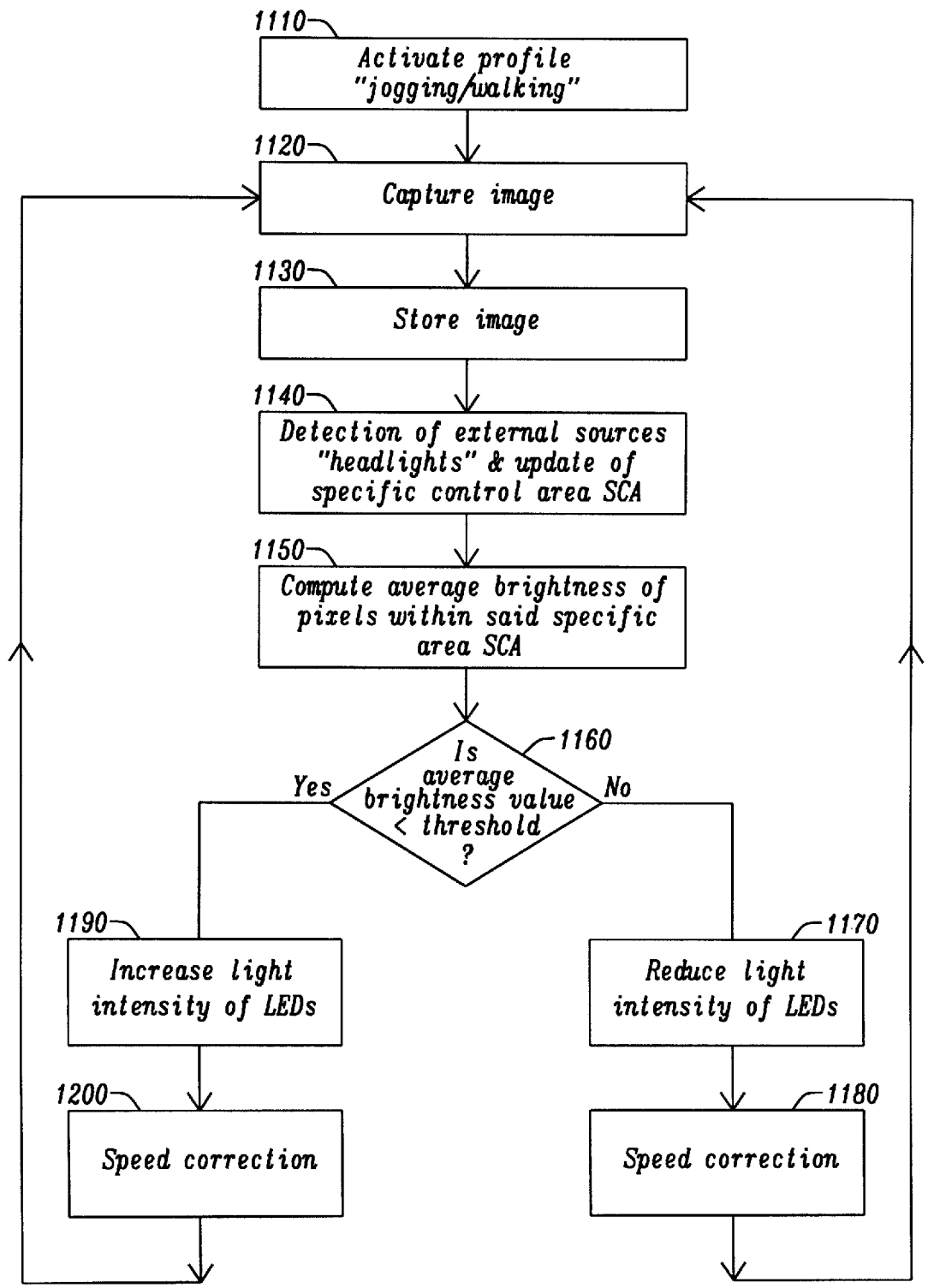
FIG. 11 illustrates a variation of the process of FIG. 10, also taking into account a criterion of speed and/or acceleration.

Referring to FIG. 11, one will now describe an alternative to the method of FIG. 10 which incorporates, instead of detecting fog/mist, a speed detection to correct the feedback control process.

Indeed, the inventors have discovered that it is possible to significant improve the regulation process of the lamp by using an increase in brightness when the lamp holder is in a situation of rapid move. On the contrary, in a situation of static activity, the process may somewhat reduce power consumption to extend battery life.

Steps 1110 to 1160 correspond exactly to steps 1010-1060 and will therefore, for the sake of conciseness, not be further developed.

When, during the test of step 1160, the average brightness value exceeds the predetermined threshold, the process then proceeds to a step 1170, wherein a first result is computed by the image processor for the purpose of reduce the power of LEDs.

The process then continues, in a step 1180, with a by a speed sensing algorithm which may be based on various criteria. In a first test, one can proceed to an analysis of the image, including analysis of the variations of the pixels at the border of the image with respect to the pixels located at the center of the image. In such a situation, the algorithm will return an information representative of a speed. Alternatively, one can also introduce within the lamp a separate speed sensor, an accelerometer (including Piezzo kind integrated in a chip such as MEMS (Micro Electro-Mechanical Systems) or a Global Positioning System (GPS) chip to provide information relative to the speed of movement of the lamp. In step 1180, when the algorithm determines a significant move of the lamp, the first result generated by the image processor 230 is corrected by an additional information so as to control an relative increase of the brightness.

The method then returns to step 1020 for the purpose of capturing a new image.

If, during the test of step 1160, the average contrast value is less than the predetermined threshold, the process continues with a step 1190, where a second result is generated by the image processor, to increase the power of emission of the LEDs.

The process then continues, at a step 1200 by an algorithm for speed detection achieving, as above in step 1180, a correction of the second result generated by the image processor and ultimately produce a control information, or a control signal to the power unit 100.

The process then returns to step 1020 for the purpose of capturing a new image.

The embodiments described with reference to FIGS. 3-11 have no other purpose than to provide a demonstration of the many possibilities that are offered by the introduction of image processor 230 within the headlamp (in this example).

Many other embodiments are possible.

In particular, the inventors have discovered that it was possible, and perfectly independently from the image processor, to make more effective the detection of fog, mist or smoke, by means of a infrared LED (IR) having a slightly off-axis (upward) with respect to the main axis of the power LED emitting light in the visible range.

Figure 12A:
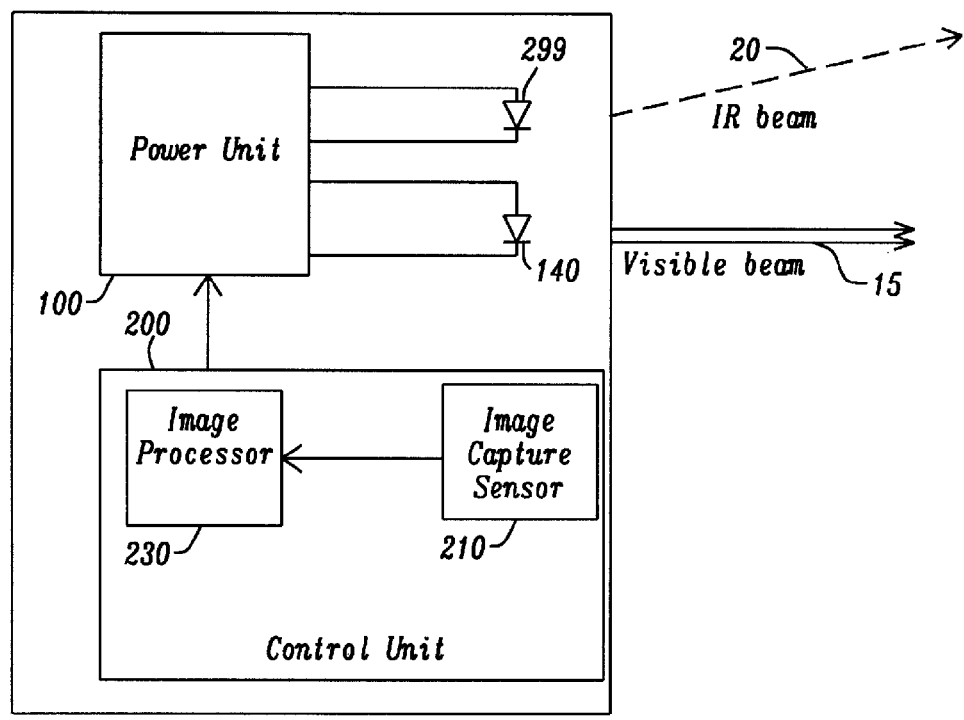
FIG. 12a illustrates one embodiment of a lamp having an improved sensor with an infra-red sensor for detecting fog/mist.

FIG. 12*a* illustrates one embodiment of the lamp having a power unit 100 for supplying power to one or more high power LEDs (only LED 140 being illustrated) and an infrared LED 299 for generating an IR beam 20 along an axis slightly offset with regard to the presumably horizontal axis 15 of LED 140.

Control unit 200 includes, as in the embodiment of FIG. 2, image sensor 210 generating images to the image processor 230, which in this particular embodiment is able to perceive information in the infrared spectrum.

It will now be described how to use the embodiment of FIG. 12*a*, in relation to the timing diagrams in FIG. 12*b*.

Figure 12B:
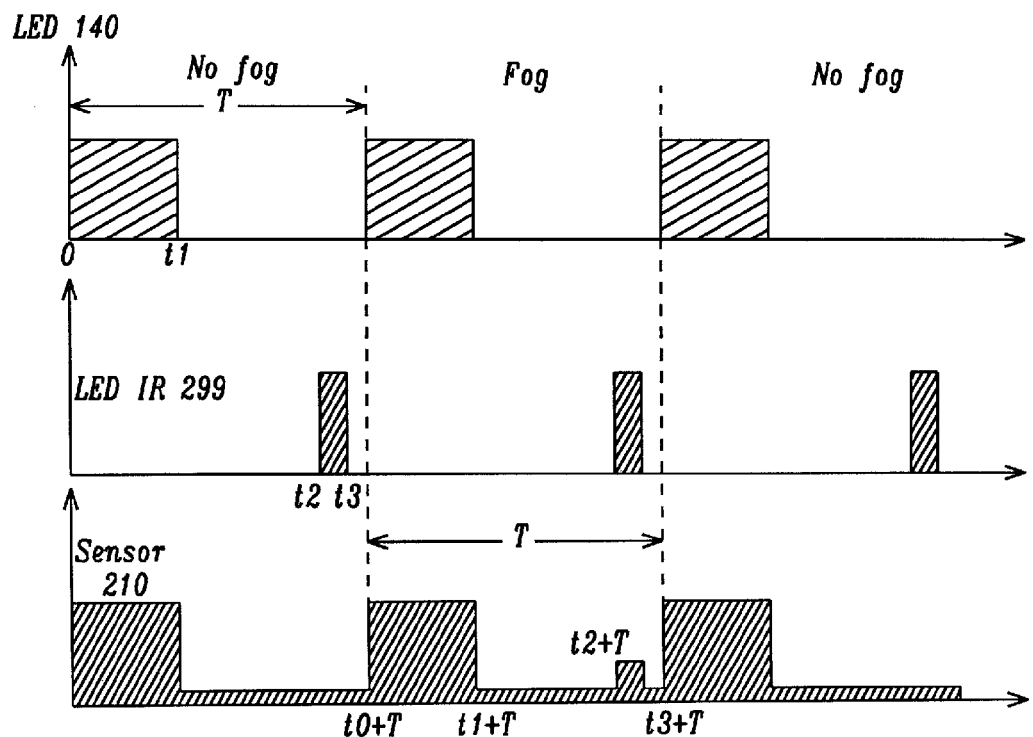

FIG. 12*b* shows, from top to bottom, the transmission signal of the LED 140, the emission of infrared LED 299 and a representation of the light received by the image sensor 210. The period T of the PWM signal is shown in the figures which show the frequency of the PWM pulse train of the light generated by LED 140, particularly between the instants $[t_0, t_1]$, $[t_0+T, t_1+T]$, $[t_0+2T, t_1+2T]$ etc. . . . It is also observed that the power unit (controlled by the control unit 100) also generates a current supply of IR diode 299 between instants $[t_2, t_3]$, $[t_2+T, t_3+T]$, $[t_2+2T, t_3+2T]$ occurring at a time when no visible light is transmitted through the power diode 140.

More specifically, the method comprises the steps of:
generation of visible light through or power LED lamps in a PWM mode;
generating an IR beam when no visible light is generated;
capturing the reflected signal during the emission of the IR beam;
comparing said reflected signal with a predetermined threshold, and when the reflected signal is above the threshold, determining fog, mist or smoke particles.

The timing diagram shows that the signal which is sensed by image sensor 210, which signal shows a peak $[t_2+T, t_3+T]$ when the fog or smoke causes a partial reflection of the IR light generated by the sensor. In this way, the image processor can discriminate a situation with the presence of fog or particles (mist, smoke) and a situation without such fog or particles.

The use of such a process can advantageously be made during steps 1080 and 1100 of the process respectively described in reference to FIGS. 10 and 11.

It should be noted that the diagram of FIG. 12 *b* is a first particular embodiment. In a second embodiment, one may also consider the generation, simultaneously, of an IR beam with a beam of visible light, so that the image sensor indiscriminately perceive the image visible and infrared peak reflected by the steam and/or water vapor. In this second embodiment, one will arrange, within the image processing algorithm, filtering means for detecting the return of the infrared peak and thus achieve the detection of the presence of fog, smoke or fog.

The invention claimed is:

1. A headlamp to be carried on a user's head and allowing hand-free lighting for such user, said headlamp comprising:
   a light source having one or more LED-type diodes;
   a power unit for supplying electric power to said light source, said power unit being controlled by a control information or a control signal;
   a control unit for controlling the light generated by said light source;
wherein said control unit comprises an image sensor included in said headlamp and aligned with the axis of said LEDs, said image sensor generating at least one image of the area illuminated by said light source and means for processing said image in order to generate said control information or said control signal,
wherein said processing means determines a specific control area (SCA) within said image, and being subject to image processing by an image processor; and said image processor calculating the average brightness of the pixels of said image or a specific control area of said image; wherein said image processor compares the result of said calculation with a predetermined threshold; and said image processor generates a control information or a control signal for increasing the light intensity of the LED when said result is less than the predetermined threshold;

said image processor generates a control information or a control signal for reducing the light intensity of the LED when said result exceeds the predetermined threshold.

2. The headlamp according to claim 1 wherein said image processor performs a contrast analysis on said image in order to detect fog, mist and/or smoke particles.

3. The headlamp according to claim 2 wherein said image processor allows the detection of periodic passage of hands, whose pixels are excluded from said specific exposure area determined by said image processor.

4. The headlamp according to claim 2 wherein said image processor allows the detection of car headlights, whose pixels are excluded from the pixels of said specific exposure area determined by said image processor.

5. The headlamp according to claim 1 wherein said image processor performs the detection of a stripe of pixels, approximately vertical, showing a brightness higher than a threshold, the pixel corresponding to said pixel stripe being excluded from said specific exposure area determined by said image processor.

6. The headlamp according to claim 5 further comprising a second sensor generating one second information representative of the reflected light intensity of the illuminated area, wherein the control of said light source being derived from both digital processing of the pixels and from said second reflection information.

7. The headlamp according to claim 1 further comprising:
at least one infrared lamp having an axis offset from the axis of said light source;
a unit to control said infrared lamp to generate an infrared beam;
a unit for detecting a reflected infrared light, said control unit deriving from said detection an information representative of the presence of fog, mist and/or smoke particles to be forwarded to said control unit.

8. The headlamp according to claim 1 comprising means for detecting snowflakes within the specific control area for the generation of said control information and said control signal.

9. The headlamp according to claim 1 comprising means for configuration of the headlamp, in particular according to one or more predetermined profiles.

10. The headlamp according to claim 9 wherein said configuration is carried out by means of a USB port for communicating with a computer, a touch pad, or a smart phone.

11. The headlamp according to claim 10 further comprising:
a first profile for "climbing/caving" implementing one or more algorithms for recognition of a rope;
a second profile to implement one or more algorithms for detecting objects such as automobile headlights.

12. A method for adjusting the light generated by a headlamp to be carried by a user and allowing hand-free lighting for such user, said headlamp comprising one or more LEDs, a controllable power unit for supplying power to the LED lamps and a control unit for controlling the light generated by the headlamp, said method comprising the steps of:
generating an image of the illuminated area of the headlamp by means of an image sensor included in said headlamp and aligned with the axis of said LEDs;
storing said image in a storage memory;
processing of said image to generate a control information or a control signal to said power unit
further comprising the steps of:
calculating the average brightness of the pixels of said image or a specific control area of said image;
comparing the result of said calculation with a predetermined threshold,
generating a control information or a control signal for increasing the light intensity of the LED when said result is less than the predetermined threshold;
generating a control information or a control signal for reducing the light intensity of the LED when said result exceeds the predetermined threshold.

* * * * *